3,476,744
Patented Nov. 4, 1969

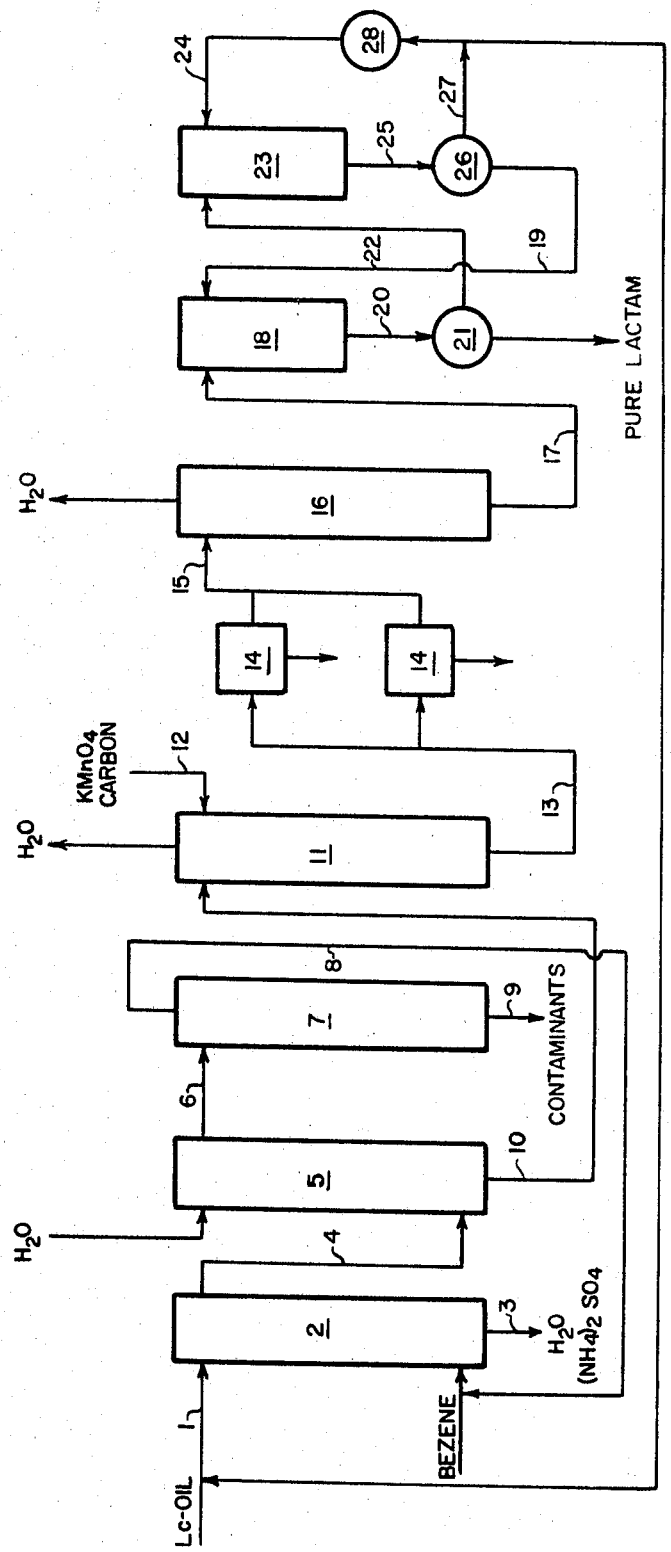

3,476,744
PROCESS FOR THE PURIFICATION OF LACTAMS

Clau Berther, Chur, and Richard Sailer, Domat-Ems, Switzerland, assignors to Inventa A.G. für Forschung und Patentverwertung, Zurich, Switzerland
Filed June 7, 1966, Ser. No. 555,739
Claims priority, application Switzerland, June 15, 1965, 8,300/65
Int. Cl. C07d 41/00, 41/06
U.S. Cl. 260—239.3                                    3 Claims

ABSTRACT OF THE DISCLOSURE

A process for refining lactams comprises the steps of melting a part of the lactam to be refined, adding the remainder of the lactam to be refined to the adiabatically maintained melt, then after equilibrium is reached, separating the resultant crystal sludge from the melt.

---

The invention relates to the purification of crude lactams without the addition of foreign substances. More particularly, it relates to a purification from a melt.

The polymerization of lactams requires a monomer of great purity. This is true for all polymerization processes, but particularly for the process known as "rapid polymerization." Furthermore, uniform purity without variations is required. However, impurities or contaminants are found in the crude lactams which vary in their character with the method according to which the crudes had been produced, but whose presence is deleterious in any event, even in small quantities. Rapid polymerization sometimes cannot be carried out at all in the presence of these small amounts of contaminants.

A number of refining and purification methods have been suggested in the past for lactams, such as, for instance, epsiloncaprolactam. Distillation has been proposed with or without the addition of such compounds as sodium hydroxide solution (German Patent 861,383) or oleum (Dutch Patent 70,839); also extraction with solvents (German published application 1,031,308; Swiss Patent 326,952); crystallization from solvents (British Patent 837,070); ion exchange (German published application 1,150,986); or treatment with permanganate (German Patent 966,502). The final step generally is a distillation from a system of a plurality of fine layer evaporators or fractionating columns.

The refining methods named labor under a number of disadvantages. For instance, in the distillation of lactams, a comparatively high amount of energy is required for the evaporation; furthermore, certain impurities are incompletely removed. Moreover, owing to the comparatively high thermic loads, new contaminants can form during distillation. When crystallization from solvents is practiced, large quantities of the solvent are required. Recovery of these solvents leads to losses and again requires distillation.

It had been found that partial crystallization of lactams from the melt is an excellent purification method. Foreign chemicals are not required, and the process is very economical because, as compared with distillation, only slight amounts of energy are required for the heat of fusion. The purification effect is the result of the melt equilibrium arising from the solidification temperature of the lactam. This is so because upon cooling of a lactam melt to its freezing point, the first crystals formed are purer than the starting material because most of the impurities have a lower melting point and/or form eutectics with the lactam. Hence, the impurities accumulate in the melt. The energy expended in the form of heat of fusion is liberated again as heat of crystallization. The latter, therefore, is a measure of the quantity of crystals formed. This heat of crystallization must be carried off until a well-separable crystal sludge is obtained. This can be carried out, e.g., in a scraper condenser. However, the apparatus is complicated and expensive. Vacuum crystallization is not feasible because of the low melting points and high boiling points of the lactams. In theory, it is possible to carry off the heat by the introduction of an inert gas which simultaneously exerts a good aeration effect. However due to the low specific heat of the gases, a comparatively high gas circulation is required or else a long period of time. For instance, 1.9 liters nitrogen at 20° C. are needed to crystallize 1 g. epsilon-caprolactam at its freezing temperature.

It now has been established that the heat of crystallization can be carried off in a very simple manner and that simultaneously a favorable thermochemical effect can be obtained when only a portion of the lactam to be refined is molten while the remainder is added to the melt as a solid. Thereby, the heat of crystallization is removed from the melt. Surprisingly, it has been found that the added solid lactam attains melt equilibrium thereby after a very short mixing time.

The salient feature of the invention resides in adding to an adiabatically maintained melt of 50–90 weight parts lactam 50–10 weight parts of solid lactam and in separating the crystal sludge formed from the melt after the melt equilibrium has been attained. In order to facilitate ready separation of the crystals from the melt, the crystal sludge formed must have sufficient flow. Therefore, the proportions of melt to solid lactam advantageously are selected so that a mixture is obtained which contains 20–70 weight percent crystals. Opportunely, the process is carried out by melting approximately 70–80 weight percent of a melt to be refined, adding thereto 20–30 weight percent lactam which is at room temperature, whereby crystallization sets in, and then separating the crystal sludge obtained into melt and crystals.

Advantageously, an amount of solid lactam is added to the melt which is calculated to balance the heat in such a manner that, after the melt equilibrium has been attained, a predetermined quantity of crystallized lactam forms. For instance, at a melt or crystallization heat, respectively, of 29 cal./g. caprolactam, a specific heat of 0.55 cal./g.° C., a solidification point of 68.5° C., a caprolactam melt temperature of 70° C. and a temperature of solid caprolactam of 20° C., 27 parts solid caprolactam added to 73 parts of the melt yield, after the melt equilibrium has been attained and under avoidance of other heat losses, 50 parts crystallized caprolactam. To refine, e.g., 100 g. caprolactam under these conditions, 4,120 cal. are required for melting. If the crystallization were carried out in the customary manner, 5,650 cal. would be required for melting, and 1,532 cal. heat of crystallization would have to be carried off.

The solid lactam can be added in the form of powder, crystals or flakes. To attain the melt equilibrium rapidly, the entire mixture must be well mixed. This can be effected either by light agitation or by introducing preheated nitrogen, or else air, hydrogen or any of the noble gases. Equilibrium is obtained within 5–30 minutes after the addition of the solid lactam. The vessel wherein the crystallization is carried out must be protected from heat losses so that the heat balance is maintained and the formation of lactam crusts at the walls is prevented. This is accomplished by insulating the vessel in the conventional manner or by using a jacketed crystallizer wherein a liquid, e.g., water, is maintained at constant temperature.

The crystal sludge formed is separated from the melt. This can be done, e.g., by means of suction filters, preheated to the freezing temperature, or by means of preheated centrifuges. The separated melt can be used repeatedly for the crystallization without incurring lesser purity of the crystals obtained.

If desired, the crude lactam can be pretreated with potassium permanganate prior to purification. Surprisingly, such a pretreatment leads to especially pure end products whereas other oxidizing agents, such as $H_2O_2$ or NaOCl, have either no or even adverse effect. The isolation of the crude lactam and the pretreatment with potassium permanganate can be effected, e.g., in such a manner that the crude lactam obtained in the synthesis is extracted with an organic solvent, such as benzene or any other suitable solvent. The crude lactam frequently is called "lactam oil" and hereinafter will at times be referred to as such. The extract is reextracted with water, and the solvent, after partial or complete separation of the accrued impurities by distillation, again is used for the extraction of lactam oil. The lactam present in the aqueous solution then is treated with $KMnO_4$. Preferably, the aqueous solution is treated with 0.01–0.1 weight percent $KMnO_4$, calculated on the lactam present, at temperatures ranging from 30 to 80° C., until all $KMnO_4$ has been reduced to $MnO_2$. It is advisable to combine this treatment with a partial distillation of the water present. After filtration, the remaining water is removed from the distillate, and the lactam thus obtained is ready for crystallization. The crystallization may be accomplished in batches or continuously. In the latter instance, the crystal sludge is present in a crystallization tube in melt equilibrium. Thereto continuously are added, from the upper end of the tube and under agitation, fresh melt and solid lactam in a predetermined ratio, while from the lower end crystal sludge proportionally is removed and introduced into a centrifuge. The quantity of lactam added and removed in proportion to the size of the vessel determines the time required to attain the melt equilibrium and, thus, the dwelling time. The mother liquor which has been separated can be returned directly to the same crystallization, if required, after scaling. If not returned, the liquor is recrystallized in a second crystallization step. In that instance, the crystal obtained in the second step can serve as the solid component in the first step. A portion of the mother liquor, in the case of multiple step crystallization a portion of the last step, is recycled into a prerefining step, e.g., into the extraction of the crude lactam with an organic solvent.

The bulk of the impurities accumulated in the mother liquor remains in the solvent after reextraction of the organic phase with water. The residue of concentrated impurities is discarded after regeneration of the solvent. Depending upon the quality of the lactam oil, a larger or smaller quantity of impurity concentrate can be removed from the process by varying the amount of solvent which is regenerated by distillation. Because otherwise a closed cycle is present, a high yield of pure lactam is obtained in the process according to the invention.

The lactam thus refined and purified lends itself extremely well to rapid polymerization.

Criteria for the purity of lactams are the melting point, the permanganate value (PV), the volatile base value (VBV) and the so-called APHA value. PV is the time in seconds required to decolorize 1 ml. n/100 $KMnO_4$ solution, admixed to 100 ml. 1% aqueous lactam solution, to an equal amount of a standard solution. The latter is prepared by dissolving 3 g. $CoCl_2 \cdot 6H_2O$ and 2 g. $CuSO_4 \cdot 5H_2O$ in one liter water. The VBV is determined by distilling 100 ml. water from a solution of 20 g. lactam in 200 ml. 1/n NaOH into a receiver containing n/10 acid. The consumption of n/10 acid by the bases is determined by titration and, in milliliters, is the VBV. The APHA is determined by comparing a 40% aqueous lactam solution with the dilution series of a standard solution. The latter contains 1.245 g. chloroplatinate ($K_2PtCl_6$) and 1 g. cobalt chloride in 1 l. water and corresponds to 500 APHA units.

The invention now will be further explained by the following examples. Example 5 relates to a continuous process and makes reference to the accompanying drawing which is a flow sheet of such a process. However, it should be understood that all this is given merely by way of illustration, and not of limitation, and that numerous changes may be made in the details without departing from the spirit and scope of the invention as hereinafter claimed.

All temperatures are degrees centigrade, all parts named are parts by weight unless otherwise specified.

EXAMPLE 1

75 kg. caprolactam melt having a PV of 450 and a VBV of 0.33 were introduced into a 120 l. stainless steel container (V4A) which had been thoroughly insulated with mineral wool. The vessel was equipped with an agitator and a heatable valve at its lower end. The caprolactam melt had a temperature of 70.5°. Within 15 minutes, 25 kg. caprolactam flakes of like characteristics as the melt were then added with agitation. Whereas the first parts of the flakes dissolved in the melt, a crystal sludge soon formed upon further addition at a constant temperature of 68.5°. After all solid caprolactam had been added, agitation was continued for 15 minutes. The crystal sludge then was withdrawn through the heated valve and introduced in a centrifuge. Of the centrifuged crystal sludge, 46 percent were in the form of crystals, the remainder was melt. The caprolactam crystals thus obtained (44 kg.) had a PV of 6,800 and a VBV of 0.07.

EXAMPLE 2

A 150 liter jacketed vessel, equipped with agitator and heatable valve, contained 90 kg. caprolactam flakes. The caprolactam had a PV of 1,000 and a VBV of 0.25. The jacket was filled with hot water which was maintained at 80–95°, and the caprolactam melted with agitation. As soon as all was molten and the melt had attained a temperature of 69–71°, the jacket was filled with water at 68.5–69.5°. 30 kg. caprolactam flakes of like characteristics were then added with agitation, and a crystal sludge having a temperature of 68.5° formed. Agitation was continued for another 15 minutes, the crystal sludge then was withdrawn through the heated valve and introduced in a preheated centrifuge, wherein crystals and melt were separated. The caprolactam crystals (55.4 kg.) constituted approximately 48% of the sludge and had a PV of 8,000 and a VBV of 0.04.

EXAMPLE 3

120 g. caprolactam flakes, obtained from the separated melts of other crystallizations, were crystallized as in Example 2. The caprolactam, before crystallization, had a PV of 340 and a VBV of 0.46. The caprolactam crystals after treatment had a PV of 7,100 and a VBV of 0.08.

EXAMPLE 4

120 kg. laurolactam having a melting point of 147 and a PV of 750 were crystallized as in Example 2, by adding to a 90 kg. melt of 149° 30 kg. laurolactam at room temperature. After separation in a correspondingly preheated centrifuge, 58.7 kg. laurolactam of a melting point of 152.5° and a PV of 6,800 resulted.

EXAMPLE 5

(The reference numerals given herein refer to the accompanying flow sheet.) 1,785 parts lactam oil per hour, containing 1,250 parts caprolactam, were introduced through line 1 into extractor 2 together with 246 parts mother liquor lactam from second crystallizing step 22–25. In extractor 2, this mixture was extracted with benzene. An aqueous ammonium sulfate solution was removed through line 3, and an approximately 13% lactam solution in benzene was introduced by way of conduit 4 into extractor 5. The lactam in that solution had a PV of less than 200, a VBV of 0.56 and an APHA of more than 35. In extractor 5, counterextraction with water was carried out, and the benzene introduced into still 7 by way of conduit 6. The distilled benzene was returned into extractor 2 by way of line 8, while 45 parts per hour of greatly contaminated lactam were drawn off through conduit 9. The aqueous lactam solution coming from extractor 5 had a concentration of approximately 33% and was conducted through line 10 into preconcentrator 11. Simultaneously, 0.725 part $KMnO_4$, dissolved in water, and 7 parts activated carbon in aqueous dispersion were introduced into preconcentrator 11. The solution thus treated was conducted by way of line 13 into filter 14 for removal of carbon and $MnO_2$, and then was carried through conduit 15 into concentrator 16. 1,446 parts lactam per hour containing at the most 0.5 percent $H_2O$ and having a temperature of 80° were introduced by way of conduit 17 into crystallizer 18 which had a capacity of 1,500 volume parts. Simultaneously, 954 parts per hour of lactam crystals from the second crystallizing step and having a temperature of 31° were added by way of conduit 19. The crystal sludge thus obtained was conducted, by way of pipe line 20, to centrifuge 21. From the latter, 1,200 parts pure crystallized caprolactam were withdrawn. The mother liquor (1,200 parts per hour) was conducted into the second crystallizer 23 through line 22 at a temperature of 72° and mixed therein with 708 parts per hour of flaked mother liquor lactam. The latter came through conduit 24. The crystal sludge formed was introduced into centrifuge 26 by way of line 25. The crystals separated in the centrifuge 26 were reconducted to the first crystallizer by way of conduit 19, while the mother liquor was recycled in part into the second crystallizer by way of line 27 and partly flaked by means of cooling roll 28, while the other part, together with lactam oil, was cycled into extractor 2.

The caprolactam obtained at 21 had a permanganate value of 14,500, a volatile base value of 0.03 and an APHA of 2. The yield calculated on the crude caprolactam, was 96%.

While in the foregoing only caprolactam and laurolactam have been named, it is to be understood that all intermediate lactams and particularly all lactams which are polymerizable and suitable as nylon bases are applicable. Likewise, benzene is not the sole applicable solvent but xylene, toluene and, generally, all water-immiscible known lactam solvents can be employed.

We claim as our invention:
1. A process for the purification of a lactam containing impurities, said impurities melting at a temperature below the solidification temperature of the lactam, or forming a eutectic mixture therewith, which comprises mixing into an adiabatically maintained melt of 50–90 weight parts of said impure lactam, 50–10 weight parts solid lactam, allowing the melt equilibrium to be attained, separating the crystal sludge thus obtained from the melt, said lactam being taken from the class consisting of monocyclic lactams having 6–12 carbons in the ring.

2. The process as defined in claim 1, wherein 70–80 weight percent lactam are melted, the remaining 30–20 weight percent lactam are added, a part of said lactam is allowed to crystallize at room temperature, and the sludge thus obtained is separated into melt and crystals.

3. The process as defined in claim 1, wherein, prior to crystallization, the lactam is treated at substantially 30–80° C. with 0.01–0.1 weight percent potassium permanganate in aqueous solution, calculated on the total lactam present.

References Cited

UNITED STATES PATENTS

| 2,813,858 | 11/1957 | Joris | 260—239.3 |
| 3,145,198 | 8/1964 | Morbidelli et al. | 260—239.3 |
| 3,179,657 | 4/1965 | Naglieri | 260—239.3 |

OTHER REFERENCES

Weissburger: Technique of Organic Chemistry, vol. III, part I, Separation and Purification, second edition, pp. 396–98, 469–70 (Interscience) (1956).

HENRY R. JILES, Primary Examiner

R. T. BOND, Assistant Examiner

U.S. Cl. X.R.

260—707